(12) United States Patent
Deng

(10) Patent No.: US 9,777,866 B2
(45) Date of Patent: Oct. 3, 2017

(54) NON-CONTACT FLOW CONTROL SYSTEM HAVING A TOTALLY SEALED CAVITY

(71) Applicant: JIANGSU VOCATIONAL COLLEGE OF INFORMATION TECHNOLOGY, Wuxi (CN)

(72) Inventor: Chao Deng, Wuxi (CN)

(73) Assignee: JIANGSU VOCATIONAL COLLEGE OF INFORMATION TECHNOLOGY, Wuxi (CN)

( * ) Notice: Subject to any disclaimer, the term of this patent is extended or adjusted under 35 U.S.C. 154(b) by 0 days.

(21) Appl. No.: 15/043,636

(22) Filed: Feb. 15, 2016

(65) Prior Publication Data

US 2017/0234450 A1    Aug. 17, 2017

(51) Int. Cl.
*F16K 31/08* (2006.01)
*F16K 31/06* (2006.01)
*F16K 3/10* (2006.01)

(52) U.S. Cl.
CPC .............. *F16K 31/088* (2013.01); *F16K 3/10* (2013.01); *F16K 31/0668* (2013.01)

(58) Field of Classification Search
CPC ....... F16K 31/088; F16K 3/10; F16K 31/0668
USPC ......... 251/65, 340, 341, 345, 205, 208, 209; 137/553, 556
See application file for complete search history.

(56) References Cited

U.S. PATENT DOCUMENTS

| | | | | |
|---|---|---|---|---|
| 3,134,404 A | * | 5/1964 | Ziccardi | F16K 31/0682 137/625.31 |
| 4,516,606 A | * | 5/1985 | Worley | F15D 1/0005 137/625.3 |
| 4,674,537 A | * | 6/1987 | Bergmann | F16K 3/085 137/625.31 |
| 5,342,025 A | * | 8/1994 | Hwang | F16K 3/085 137/556 |
| 5,417,083 A | * | 5/1995 | Eber | F16K 3/085 251/129.11 |
| 5,704,588 A | * | 1/1998 | Korfgen | F16K 3/36 251/208 |
| 6,192,922 B1 | * | 2/2001 | MacGibbon | F16K 3/085 137/486 |
| 7,143,786 B2 | * | 12/2006 | Romero | F16K 3/08 137/594 |
| 7,726,338 B2 | * | 6/2010 | Clasen | F16K 3/085 137/625.31 |

(Continued)

*Primary Examiner* — Craig Schneider
*Assistant Examiner* — Andrew J Rost
(74) *Attorney, Agent, or Firm* — Gokalp Bayramoglu

(57) ABSTRACT

The present invention discloses a non-contact flow control system having a totally sealed cavity, comprising a housing, a flow control unit and an operation unit. The housing is provided with a fluid inlet, a fluid outlet, and a fluid channel extending between the fluid inlet and the fluid outlet; the flow control unit is arranged in the fluid channel and the operation unit is arranged on an outer side of the housing, wherein the operation unit comprises an operation element and an outer magnet fixed on the operation element; the flow control unit comprises a flow control element and an inner magnet fixed on the flow control element; when the operation element moves relative to the housing, the flow control element can move under the action of a magnetic force between the outer magnet and the inner magnet, thereby changing the flow of the system.

11 Claims, 11 Drawing Sheets

(56) References Cited

U.S. PATENT DOCUMENTS

| | | | |
|---|---|---|---|
| 8,714,520 B2 * | 5/2014 | Sun | F16K 11/074 137/625.31 |
| 2011/0114865 A1 * | 5/2011 | Wu | F16K 3/08 251/321 |

* cited by examiner

NON-CONTACT FLOW CONTROL SYSTEM HAVING A TOTALLY SEALED CAVITY

FIELD OF THE INVENTION

The present invention relates to a flow control system, and in particular relates to a system capable of realizing flow control and opening and closing by means of magnetic driving and a pressure positive-feedback mechanism.

BACKGROUND OF THE INVENTION

Such regulation functions as cutting off, diversion, reflux resistance and flow splitting are required in a fluid conveying system. A valve is one of major devices for realizing these functions. Through long-term improvements and innovations, a plurality of forms of valves have been developed, such as a sluice valve, a needle valve, a dummy valve, a butterfly valve, a plug valve and a ball valve. The valves of these forms differ in structure in numerous ways, but in summary, it is apparent that there is not a big difference in their nature. It is mainly reflected in two aspects: on one hand, with respect to a flow control unit, a valve core device is mostly arranged in a fluid passing direction or in an axial direction of a cavity for each of those valves and the valve core is used for realizing the regulation of flow rates and open and close states; on the other hand, with respect to an operation unit, a device is mostly arranged in a radial direction of a pipeline or outside the pipeline for each of the valves to realize control on states of the valve core. In this way, no matter which type of valve is used, a common aspect is present, i.e., a pipe wall is broken by the connection of the operation unit outside the pipeline and the valve core, leading to that the pipeline itself is not in a closed state. In severe working condition environments, such as corrosion, high temperatures or high pressures, as time goes by, the above-mentioned features are prone to cause leakage at a position in the pipeline where a control mechanism passes through the pipeline. This is one of important problems urgent to be solved in the field of valves at present.

SUMMARY OF THE INVENTION

One objective of the present invention is to provide a flow control system higher in fluid leak proofness.

In order to achieve the objective, the present invention provides a non-contact flow control system having a totally sealed cavity, comprising a housing, a flow control unit and an operation unit, wherein the housing comprises a fluid inlet, a fluid outlet, and a fluid channel extending between the fluid inlet and the fluid outlet; the flow control unit is set in the fluid channel and the operation unit is arranged on an outer side of the housing, wherein the operation unit comprises an operation element and an outer magnet fixed on the operation element; the flow control unit comprises a flow control element and an inner magnet fixed on the flow control element; when the operation element moves relative to the housing, the flow control element can move under the action of a magnetic force between the outer magnet and the inner magnet, thereby changing the flow of the system.

In the flow control system of the present invention, the outer magnet is arranged on the operation element and the inner magnet is arranged on the flow control element so that non-contact control on the flow control element can be realized by use of the characteristics of the magnetic field, i.e., the operation element can control the flow control element without passing through the housing and without mechanical contact with the flow control element; hence, the total tightness of a cavity of the housing is guaranteed, and therefore, the reliability of the system is improved in the aspect of leak prevention.

Other features and advantages of the present invention will be described in detail in subsequent detailed description of the embodiments.

BRIEF DESCRIPTION OF THE DRAWINGS

Accompanying drawings are used for providing further understanding of the present invention and forms a part of the description that explains the present invention together with detailed description of the embodiments below without limiting the present invention, in which.

DETAILED DESCRIPTION OF THE INVENTION

Figure 1:
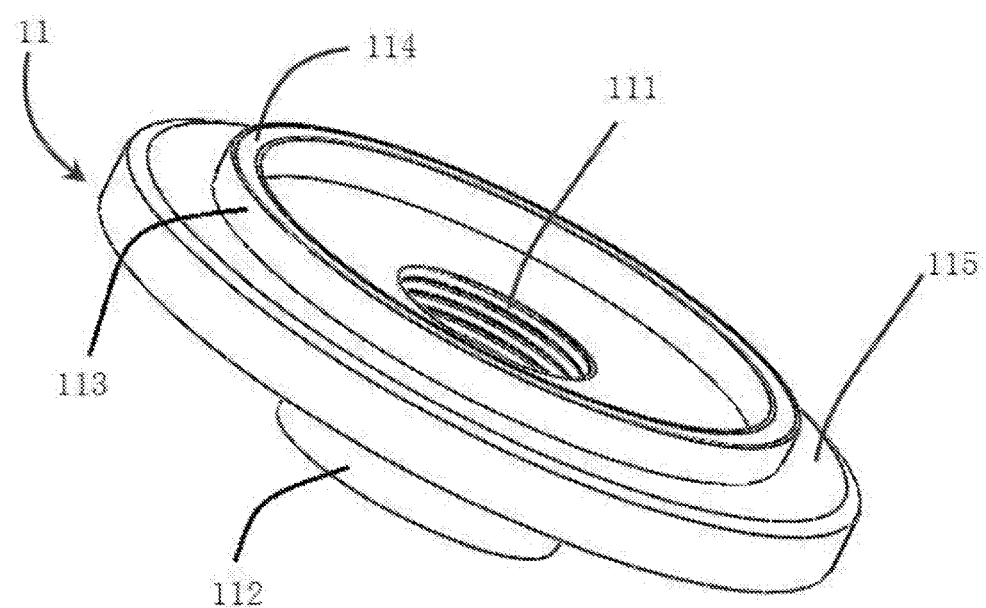
FIG. 1 is a structural schematic diagram of an inflow flange in a flow control system according to one embodiment of the present invention.

The specific embodiments of the present invention are described in detail below in combination with the accompanying drawings. It should be understood that the specific embodiments described herein are merely used for explaining and interpreting the present invention, instead of limiting the present invention.

The present invention provides a flow control system, namely, a flow control valve, comprising a housing, a flow control unit and an operation unit, wherein the housing is provided with a fluid inlet 111, a fluid outlet 131, and a fluid channel extending between the fluid inlet 111 and the fluid outlet 131; the flow control unit is arranged in the fluid channel and the operation unit is arranged on an outer side of the housing, wherein the operation unit comprises an operation element and an outer magnet 22 fixed on the operation element, the flow control unit comprises a flow control element and an inner magnet 42 fixed on the flow control element; when the operation element moves relative to the housing, the flow control element can move under the action of a magnetic force between the outer magnet 22 and the inner magnet 42, thereby changing the flow of the system.

In the flow control system of the present invention, the outer magnet 22 is set on the operation element and the inner magnet 42 is set on the flow control element so that non-contact control on the flow control element can be realized by use of the characteristics of the magnetic field, i.e., the operation element controls the flow control element without passing through the housing and without mechanical contact with the flow control element; hence, the total tightness of a cavity of the housing is guaranteed, and therefore, the reliability of the system is improved in the aspect of leakage prevention.

The present invention has no limitations to specific structures of the flow control element and the operation element; that is to say, the flow control element and the operation element can be of various appropriate structures, respectively; as long as the non-contact control of the flow control element on the flow control element is realized by use of the characteristics of a magnetic field and a fluid pressure positive-feedback mechanism, they all fall into the protection scope of the present invention.

In one embodiment, as shown in FIGS. 8, 10, 13, 15 and 17, in the flow control system of the present invention, the fluid channel in the housing is provided with a circular section; the flow control element comprises a disc-shaped movable valve plate 41 and a disc-shaped fixed valve plate 45; the fixed valve plate 45 is fixed in the housing, while the movable valve plate 41 is rotatably located within the housing and on one side of the fixed valve plate 45 facing the fluid inlet 111, namely the upstream of the fixed valve plate 45, and therefore, the movable valve plate 41 can be coaxially stacked on the fixed valve plate 45 under the action of a fluid pressure. The radius of the movable valve plate 41 and the radius of the fixed valve plate 45 both are equal to the radius of the fluid channel; the inner magnet 42 is fixed on the movable valve plate 41; the movable valve 41 is provided with a first fluid through hole 411, while the fixed valve plate 45 is provided with a second fluid through hole 451 matched with the first fluid through hole 411. In such embodiment, when the operation element moves relative to the housing, the movable valve plate 41 can rotate around a central axis thereof under the action of a magnetic force between the outer magnet 22 and the inner magnet 42, thereby changing an overlapping area of the first fluid through hole 411 and the second fluid through hole 451 and further changing the flow of the system.

A fluid pressure difference of the two sides of the movable valve plate 41 can force the movable valve plate 41 and the fixed valve plate 45 to be closely attached to each other. Additionally, the smaller the overlapping area of the first fluid through hole 411 and the second fluid through hole 451 is, the greater the fluid pressure difference of the two sides of the movable valve plate 41 is and the tighter the fitting of the movable valve plate 41 and the fixed valve plate 45 is. Such a pressure positive-feedback mechanism effectively reduces the probability of leakage of a fluid between the valve plates 41 and 45 and also can prevent the movable valve plate 41 from rotating around the central axis thereof due to noise disturbance to affect the flow control accuracy, thereby enhancing the anti-interference performance and stability of the system; furthermore, such a pressure positive-feedback mechanism also helps to adaptively compensate for a gap generated due to long-term wear of parts.

Figure 10:
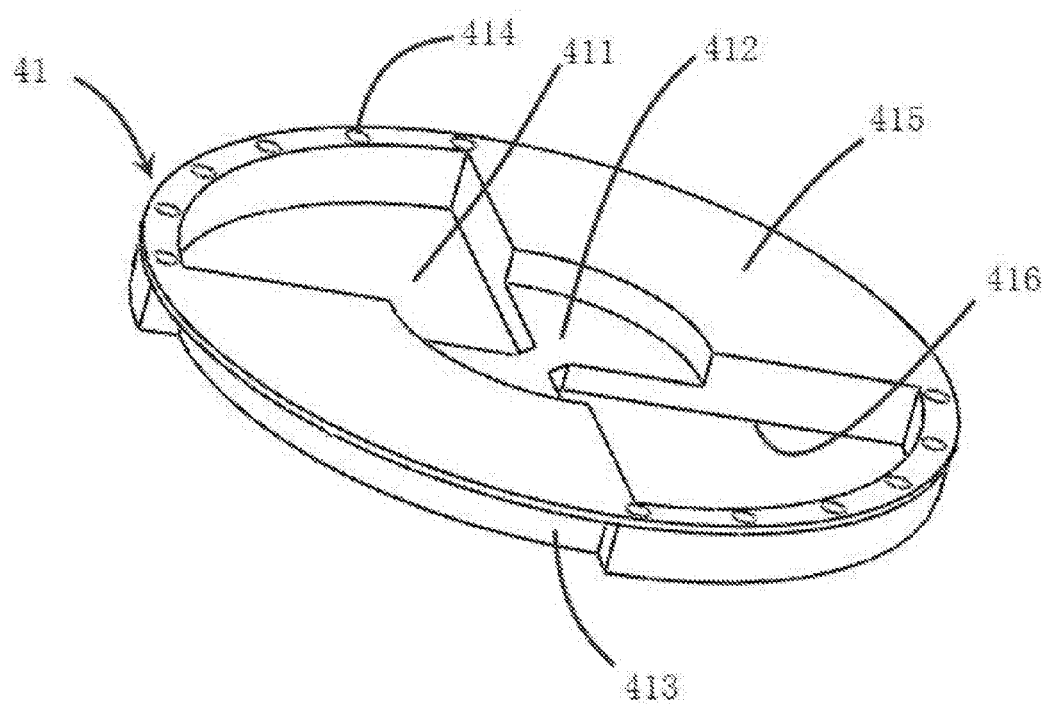
FIG. 10 is a structural schematic diagram of a movable valve plate in a flow control system according to one embodiment of the present invention.
Figure 15:
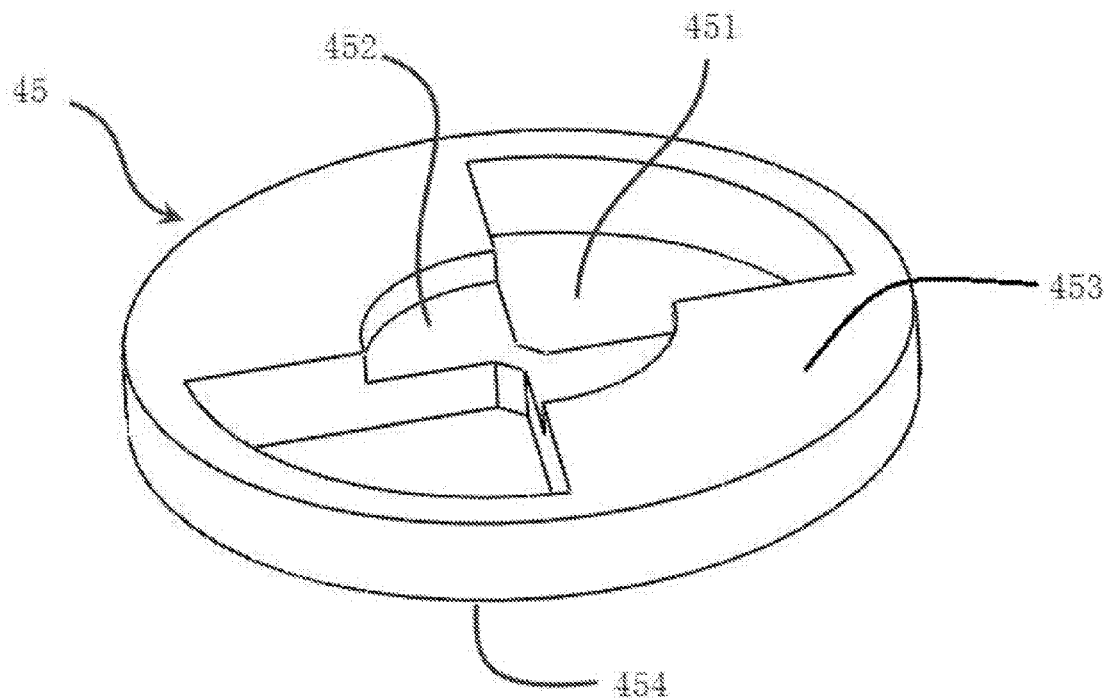
FIG. 15 is a structural schematic diagram of a fixed valve plate in a flow control system according to one embodiment of the present invention.
Figure 16:
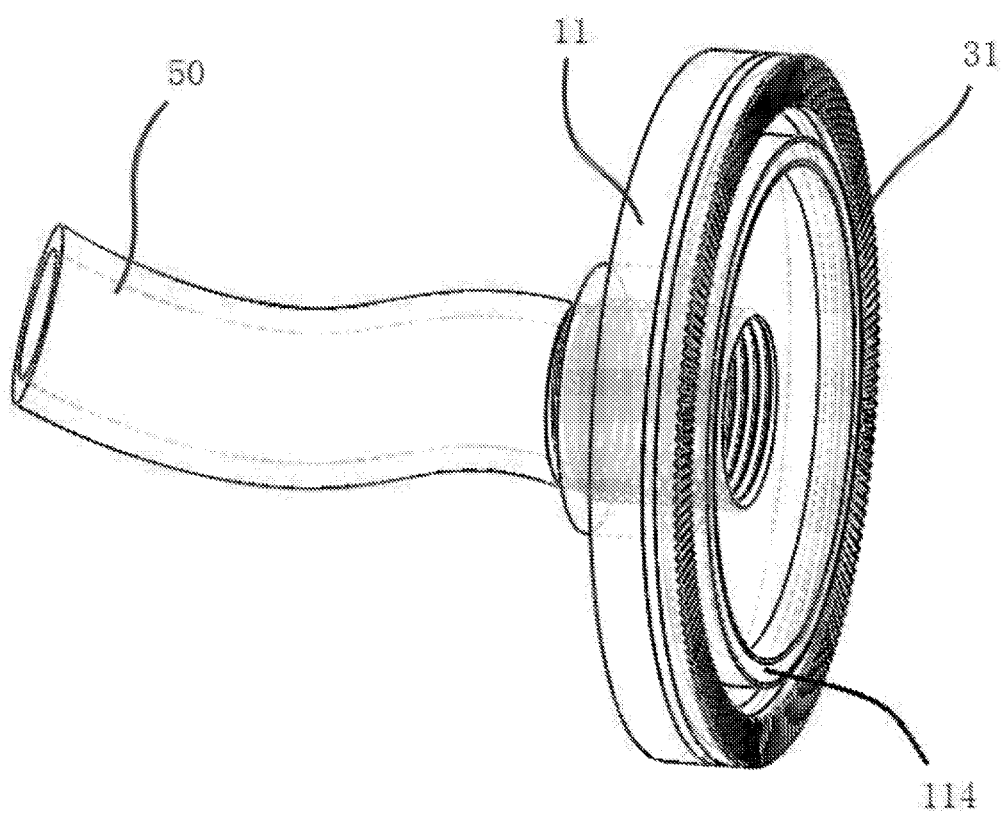
FIG. 16 is an assembly diagram of an inflow flange and a locking ring in a flow control system according to one embodiment of the present invention, wherein an upstream fluid pipeline is also illustrated.

The first fluid through hole 411 and the second fluid through hole 451 can be arranged in any appropriate positions of the valve plates and also can be of various appropriate shapes. In one embodiment, as shown in FIGS. 10 and 15, the outlines of the first fluid through hole 411 and the second fluid through hole 451 are in a sector shape, and a sector center of the first fluid through hole 411 is substantially coincident with a center of the movable valve plate 41, while a sector center of the second fluid through hole 451 is substantially coincident with a center of the fixed valve plate 45; when the first fluid through hole 411 and the second fluid through hole 451 are completely aligned to each other, a flow through the system is the maximum; when the first fluid through hole 411 is completely staggered from the second fluid through hole 451, a flow through the system is the minimum (theoretically equal to zero). In such an embodiment, the overlapping area of the first fluid through hole 411 and the second fluid through hole 451 is linearly related to a rotating angle of the movable valve plate 41, and therefore, accurate flow adjustment can be realized.

The movable valve plate 41 can be provided with two first fluid through holes 411 symmetrical about the center of the movable valve plate 41, while the fixed valve plate 451 can be provided with two second fluid through holes 451 symmetrical about the center of the fixed valve plate 45; a central angle α of the sector can be approximately equal to 90° so that the useless travel (namely travel not affecting the flow rates) of the movable valve plate 41 is minimized. When the central angle of the sector is equal to 90°, theoretically, the first fluid through holes 411 and the second fluid through holes 451 can be completely staggered from each other and the system can be completely closed. However, due to various errors, such as a part manufacturing error, an assembly error and a stressed deformation, the first fluid through holes 411 and the second fluid through holes 451 are impossibly completely staggered from each other, that is, a downstream end face 416 of the movable valve plate 41 can not completely cover the second fluid through holes 451, thereby leading to leakage. For this reason, the central angle α of the sector can be set to be slightly smaller than 90°; for example, 85°<α<89°, so that a certain positional redundancy can be reserved to ensure reliability of throttling.

The fluid inlet 111 is formed in an inflow end of the housing, while the fluid outlet 131 is formed in the outflow end of the housing; a downstream end face 454 of the fixed valve plate 45 can be attached to an inner side of the outflow end of the housing.

Due to a pressure difference between the inflow end and the outflow end of the housing, the fluid may permeate into the outflow end with a relatively low pressure along engagement surfaces of various parts. To this end, an elastic dummy plate 44 is arranged between the movable valve plate 41 and the fixed valve plate 45; the elastic dummy plate 44 is fixed on the fixed valve plate 45 and provided with third fluid through holes 441 matched with the second fluid through holes 451; the radius of the elastic dummy plate 44 is slightly greater than the radius of the fluid channel, that is, the elastic dummy plate 44 is in interference fit with the housing; in this way, the probability of the fluid permeating along an inner wall of the housing under the action of the pressure difference is reduced. In such a case, the movable valve plate 41 is closely attached to the elastic dummy plate 44 under the action of the fluid pressure. Due to good elasticity of the elastic dummy plate 44, the elastic dummy plate 44 will deform at the moment, whereby the probability that fluid permeating along the downstream end face 416 of the movable valve plate 41 under the action of the pressure difference is further eliminated. The elastic dummy plate 44 can be made out of rubber, for example.

To further guarantee that the movable valve plate 41 is always held down on the elastic dummy plate 44, preferably, elastic elements are arranged in the housing and elastically biasing the movable valve plate 41 on the elastic dummy plate 44.

In the flow control system of the present invention, the housing can be of various appropriate structures. In one embodiment, as shown in FIGS. 1, 2, 3 and 17, the housing comprises an inflow flange 11, a main body 12 and an outflow flange 13. The fluid inlet 111 is formed in the inflow flange 11, while the fluid outlet 131 is formed in the outflow flange 13; one end of the main body 12 is fixed on an engagement surface 115 of the inflow flange 11, while the other end is fixed on an engagement surface 133 of the outflow flange 13; the fixed valve plate 45 is fixed within the main body 12, while the movable valve plate 45 is rotatably located within the main body 12. Here, the fixed valve plate 45 can be fixed on the engagement surface 115 of the inflow flange 11 or an inner peripheral surface of the main body 12. An inflow connector 112 is arranged on the inflow flange 11 to facilitate connection with an upstream fluid pipeline 50; an outflow connector 132 is arranged on an outflow flange 12 to facilitate connection with a downstream fluid pipeline 60.

Figure 13:
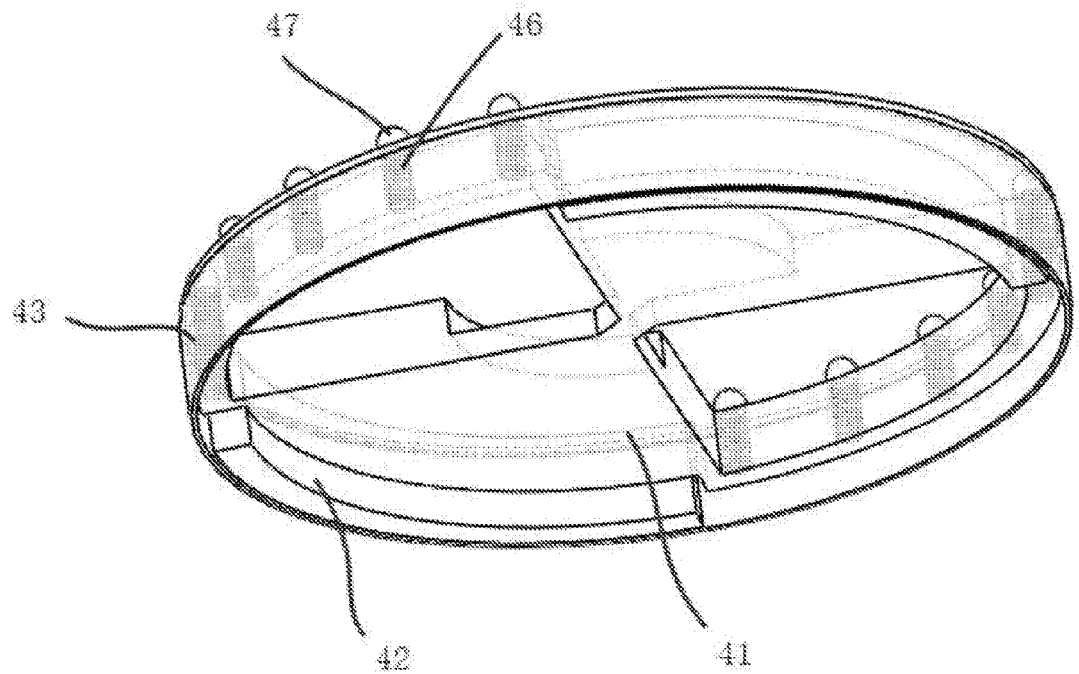
FIG. 13 is a schematic diagram of assembling a movable valve plate, an inner magnet, an inner bounding ring, a spring and balls in a flow control system according to one embodiment of the present invention.
Figure 14:
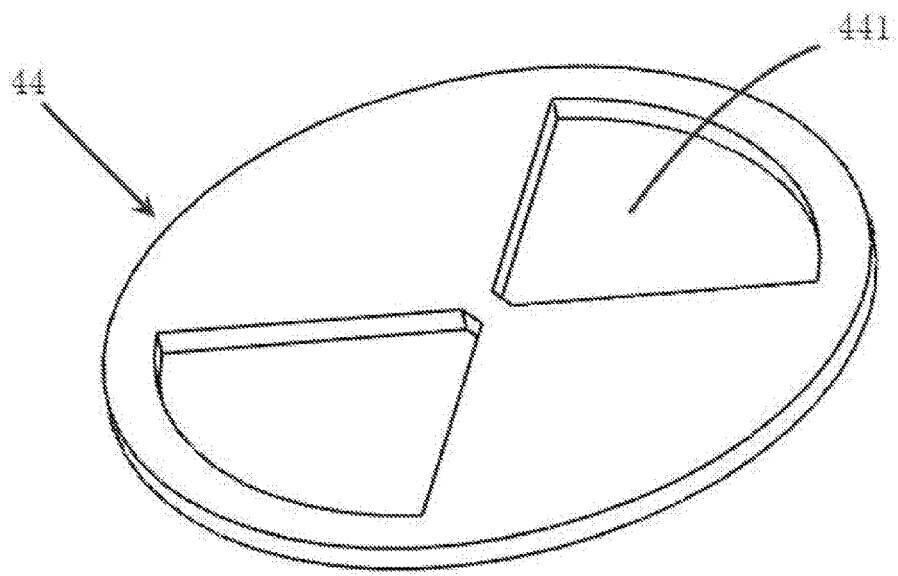
FIG. 14 is a structural schematic diagram of an elastic dummy plate in a flow control system according to one embodiment of the present invention.

As shown in FIGS. 10 and 13, a plurality of blind holes 414 can be formed in the movable valve plate 41; the elastic elements can be springs 46 arranged in the blind holes 414; one end of each spring 46 props against the bottom of the corresponding blind hole 414, while the other end of the spring props against the inflow flange 11. In such a case, in order to reduce a frictional force to the movable valve plate 41 during rotation, a ball 47 is arranged between each spring 46 and the inflow flange 11 and the spring 46 is used for biasing the ball 47 on the inflow flange 11. In order to constrain a trajectory of each ball 47, an annular raceway 114 is arranged on the engagement surface 115 of the inflow flange 11; the annular raceway 114 is arranged to surround the fluid inlet 111 and the springs 46 elastically biasing the balls 47 on the annular raceway 114. The plurality of blind holes 414 can be formed at an edge of the movable valve plate 41 and arranged at intervals in a circumferential direction of the movable valve plate 41. The section of the annular raceway 114 can be U-shaped, for example.

The annular raceway 114 can be directly arranged on the engagement surface 115 of the inflow flange 11. Optionally, as shown in FIG. 1, an annular lug boss 113 can be formed on the engagement surface 115 of the inflow flange 11 and the annular channel 114 is arranged on the annular lug boss 113.

As shown in FIGS. 10 and 15, a first flow passage groove 412 matched with the fluid inlet 111 is formed in the middle of an upstream end face 415 of the movable valve plate 41, and the first fluid through hole 411 is in fluid communication with the first flow passage groove 412; a second flow passage groove 452 matched with the fluid outlet 131 is formed in the middle of the downstream end face 454 of the fixed valve plate 45, and the second fluid through hole 451 is in fluid communication with the second flow passage groove 452. Arrangement of the first flow passage groove 412 is contributes to guiding the fluid at the fluid inlet 111 to the first fluid through hole 411, and arrangement of the second flow passage groove 452 contributes to guiding the fluid passing by the second fluid through hole 451 to the fluid outlet 131.

Figure 4:
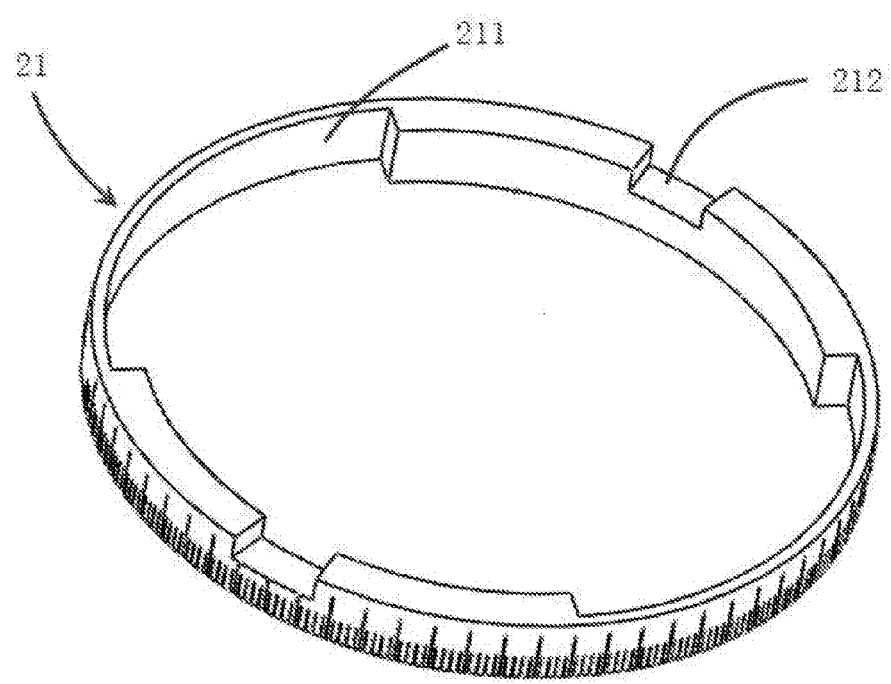
FIG. 4 is a structural schematic diagram of an operation ring in a flow control system according to one embodiment of the present invention.
Figure 17:
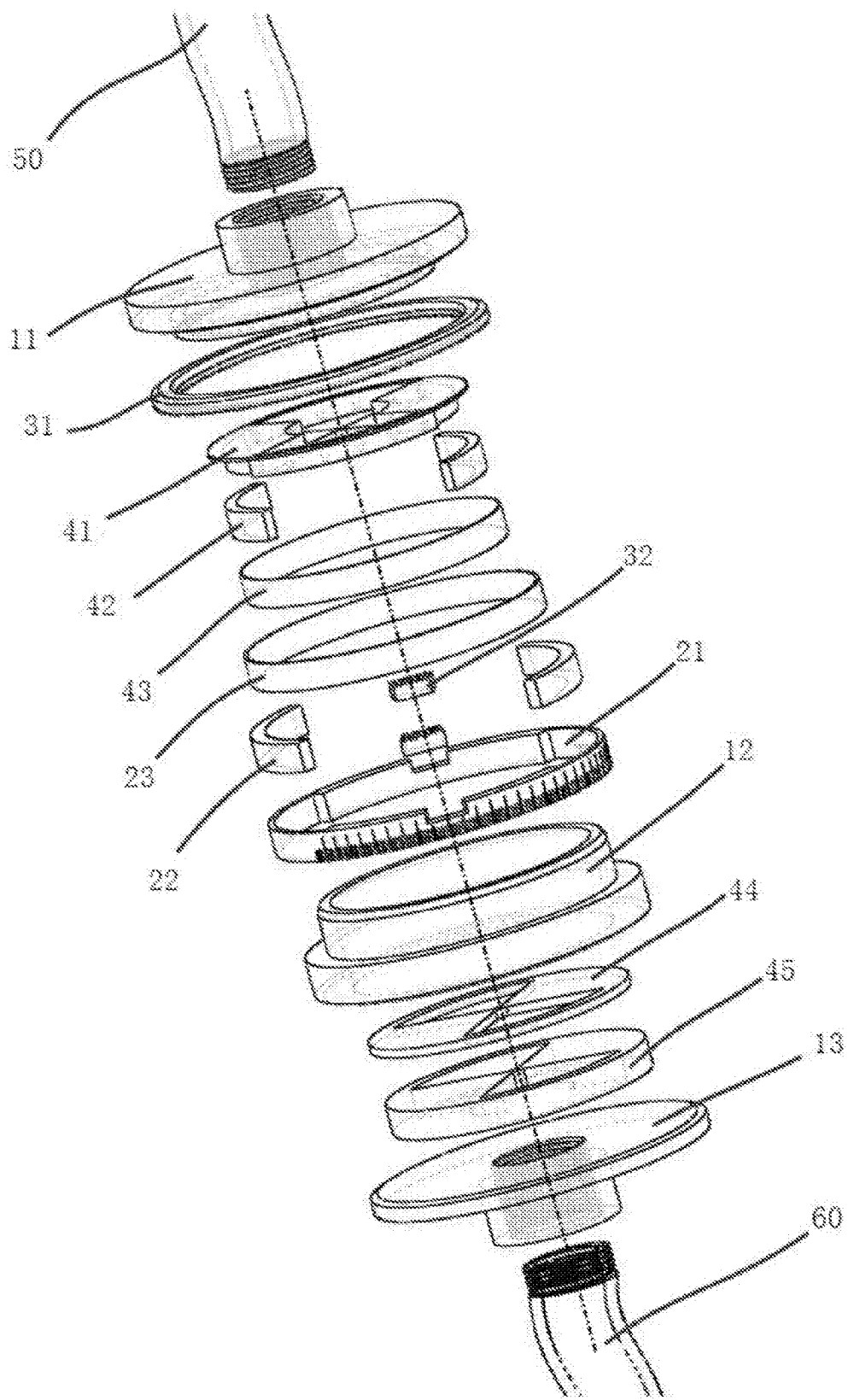
FIG. 17 is an exploded schematic diagram of parts of a flow control system according to one embodiment of the present invention.
Figure 18:
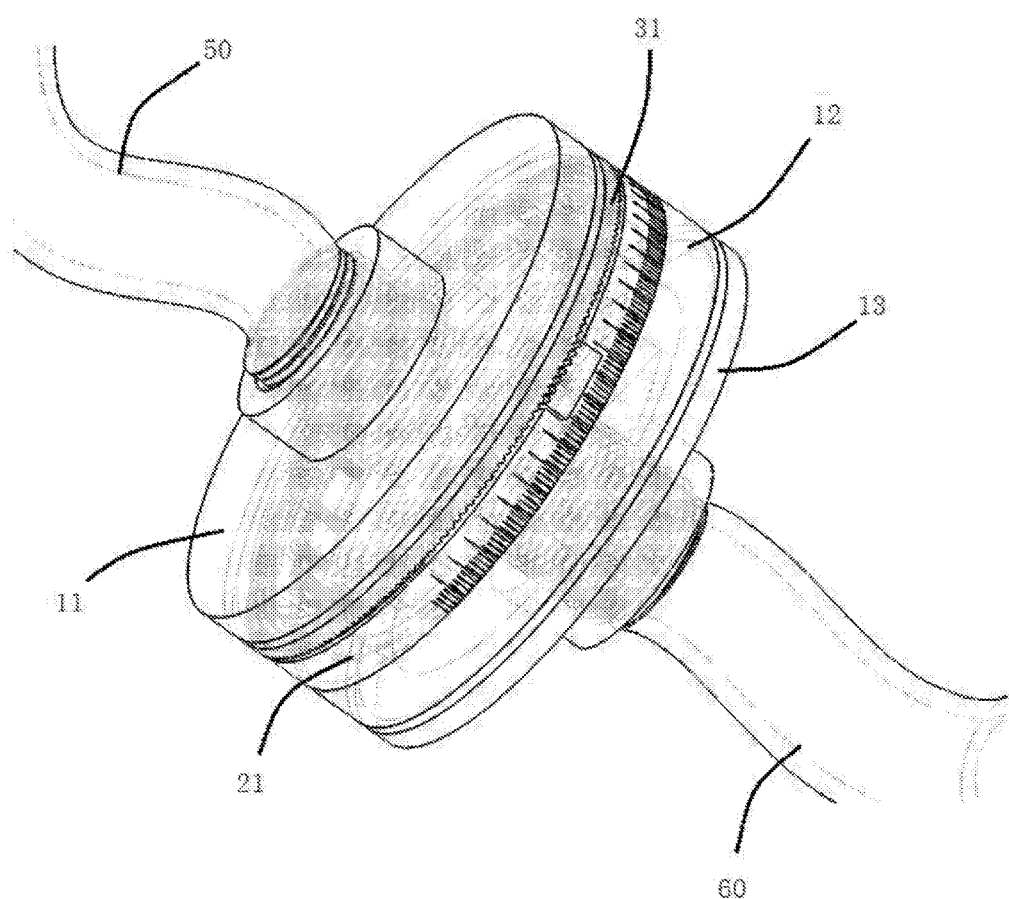
FIG. 18 is an overall assembly diagram of a flow control system according to one embodiment of the present invention.

As mentioned above, in the flow control system of the present invention, the operation element can be of various appropriate structures. In one embodiment, as shown in FIGS. 4 and 17, the operation element is constructed to an operation ring 21 that rotatably sleeves the main body 12. When the operation ring 21 is rotated (no matter under manual driving, mechanical, electrical or hydraulic driving, or the like), the operation ring 21 drives the outer magnet 22 to rotate, and the outer magnet 22 may drive the inner magnet 42 to rotate together while rotating under the action of the magnetic force between the outer magnet 22 and the inner magnet 42, thereby driving the movable valve plate 41 to rotate.

Figure 5:
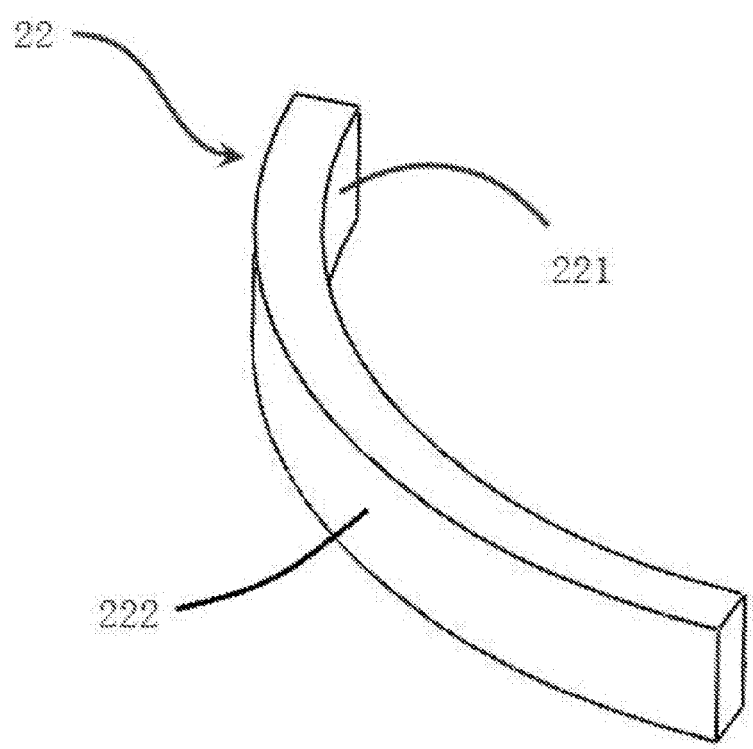
FIG. 5 is a structural schematic diagram of an outer magnet in a flow control system according to one embodiment of the present invention.
Figure 11:
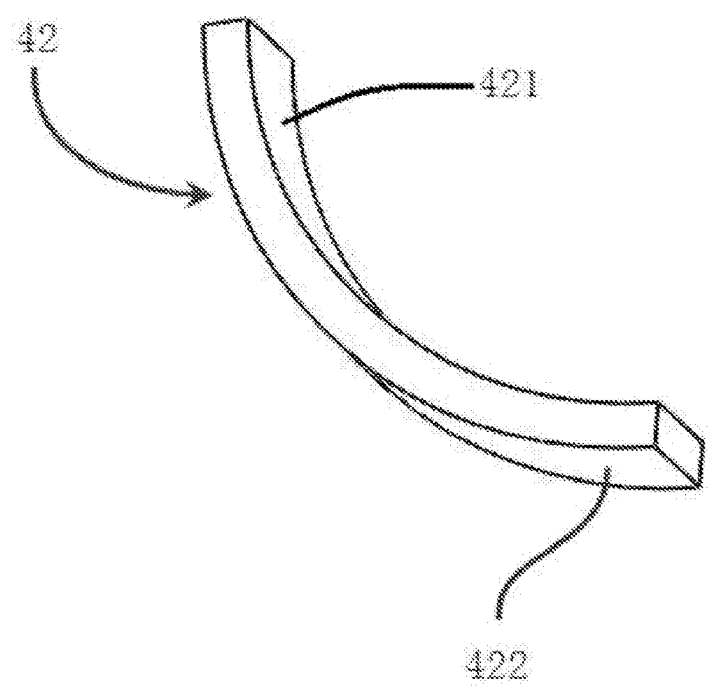
FIG. 11 is a structural schematic diagram of an inner magnet in a flow control system according to one embodiment of the present invention.

In such a case, as shown in FIGS. 5 and 11, the outer magnet 22 can be constructed to an arc-shaped magnet extending in a circumferential direction of the operation ring 21, while the inner magnet 42 can be constructed to an arc-shaped magnet extending in a circumferential direction of the movable valve plate 41, and the two magnets are both radially magnetized; the polarity of an inner cambered surface 221 of the outer magnet 22 can be opposite to the polarity of an outer cambered surface 422 of the inner magnet 42 to form a magnetic field attraction. For example, the inner cambered surface 221 of the outer magnet 22 serves as an N pole, while the outer cambered surface 222 of the same serves as an S pole; the outer cambered surface 422 of the inner magnet 42 serves as an S pole, while the inner cambered surface 421 of the same serve as an N pole. Certainly, in other possible embodiments, the magnetic force between the outer magnet 22 and the inner magnet 42 also can be a repulsive force. A corresponding central angle of the outer magnet 22 and a corresponding central angle of the inner magnet 42 are equaled as much as possible to achieve a best magnetic driving effect. In the present embodiment, considering the influence of other parts and in combination with FIGS. 4, 8, 10, 13 and 15, an angle between the inner and outer magnets is optimally slightly smaller than or equal to 90° (such as 89°), whereby maximum magnetic force control can be realized. The number of the outer magnets 22 and the number of the inner magnets 42 can be specifically set according to requirements. In the embodiments as shown in the figures, two outer magnets 22 and two inner magnets 42 are adopted.

The outer magnets 22 and the inner magnets 42 can be fixed on the operation rings 21 and the movable valve plates 41 in various appropriate manners, respectively. In one embodiment, as shown in FIGS. 4 and 8, a mounting groove 211 is formed in an inner peripheral surface of the operation ring 21 and the outer magnets 22 are embedded in the mounting groove 211; as shown in FIGS. 10 and 13, a receiving groove 413 is formed in an outer peripheral surface of the movable valve plate 41 and the inner magnets 42 are embedded in the receiving groove 413.

Figure 6:
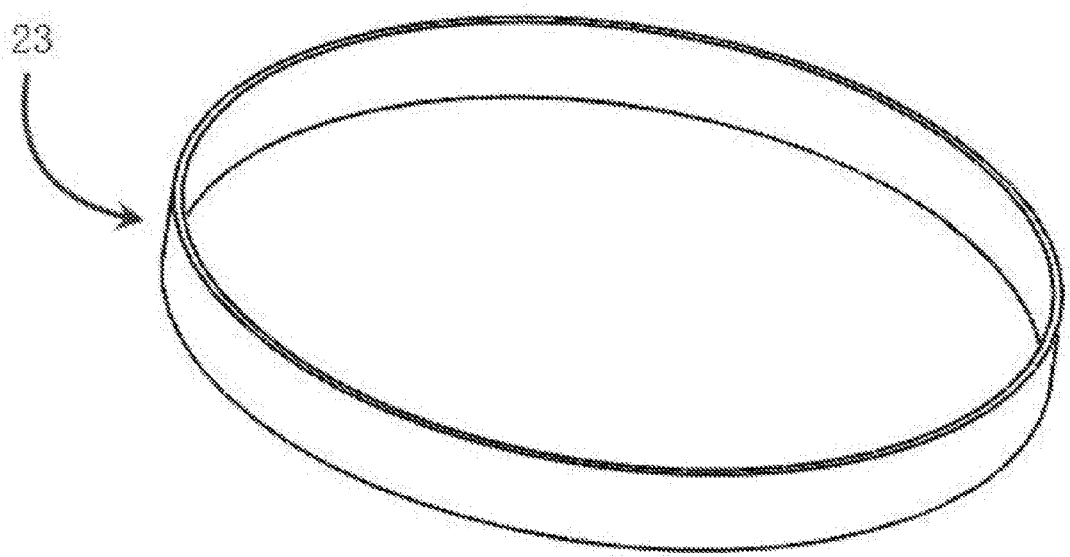
FIG. 6 is a structural schematic diagram of an outer bounding ring in a flow control system according to one embodiment of the present invention.
Figure 12:
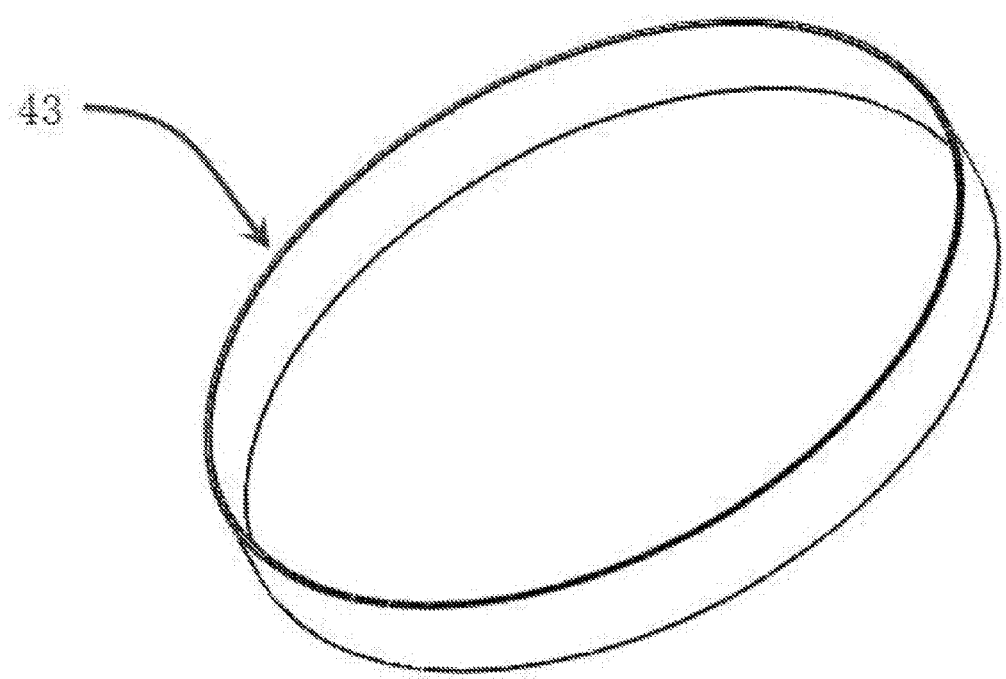
FIG. 12 is a structural schematic diagram of an inner bounding ring in a flow control system according to one embodiment of the present invention.

As mentioned above, the cambered surfaces close to the outer magnets 22 and the inner magnets 42 are opposite in magnetic poles to generate a mutual attraction between the inner and outer magnets. On one hand, various parts of the system are inconvenient to assemble; on the other hand, the inner cambered surfaces 221 of the outer magnets 22 can be firmly attached to an outer wall of the housing under the action of the magnetic field attraction to produce a strong frictional force; similarly, the outer cambered surfaces 422 of the inner magnets 42 also are firmly adsorbed on the inner wall of the housing also to produce a strong frictional force, and therefore, it may increase a driving force needed by rotating the operation ring 21. In order to solve the problem, as shown in FIGS. 6 and 8, the operation unit further comprises an outer bounding ring 23; the operation ring 21 sleeves an outer peripheral surface of the outer bounding ring 23 and the outer magnet 22 is in interference fit with the outer bounding ring 23; as shown in FIGS. 12 and 13, the flow operation unit further comprises an inner bounding ring 43 that sleeves an outer peripheral surface of the movable valve plate 41 and is in interference fit with the inner magnets 42.

The outer bounding ring 23 functions in preventing the outer magnets 22 from being attached to the housing under the action of the magnetic field force and fixing the outer magnets 22 in the mounting groove 211 of the operation ring 21. Similarly, the inner bounding ring 22 functions in preventing the inner magnets 42 from being attached to the housing under the action of the magnetic field force and fixing the inner magnets 42 in the receiving groove 413 of the movable valve plate 41. Such a structure ensures movement smoothness of related parts in the system. The inner bounding ring 43 is in interference fit with the inner magnets 42, and it ensures that the inner bounding ring 43 moves together with the movements of the inner magnets 42; similarly, the outer bounding ring 23 is also in interference fit with the outer magnets 22, and it ensures that the outer bounding ring 23 rotates together with the rotations of the outer magnets 22.

Figure 8:
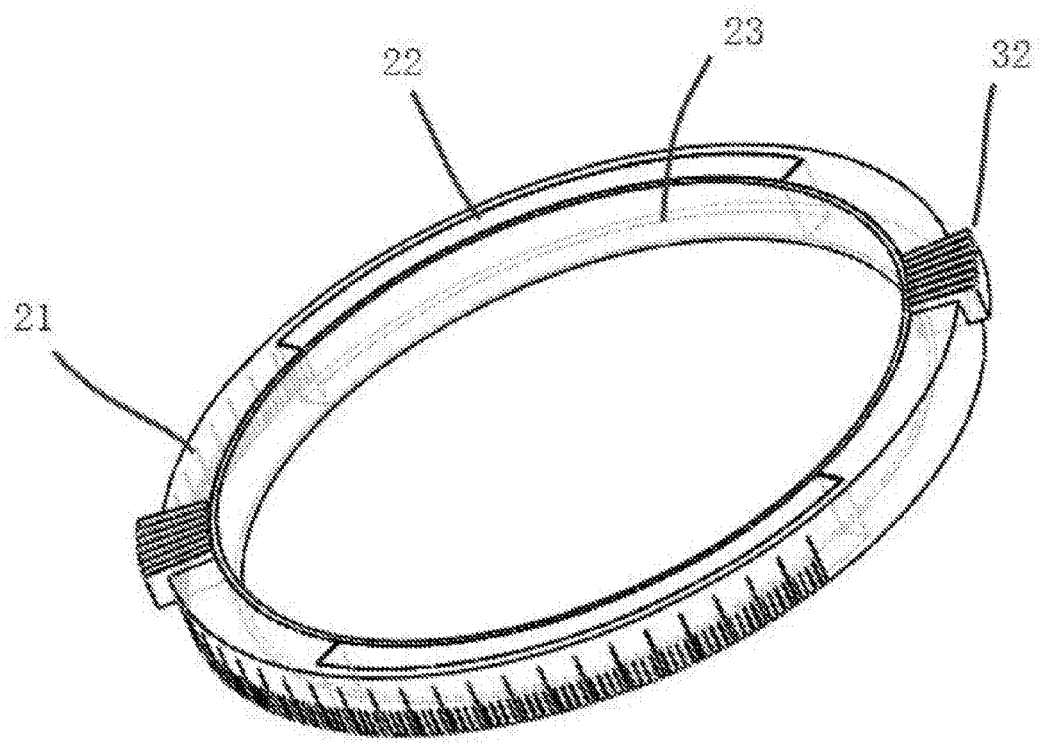
FIG. 8 is an assembly diagram of an operation ring, an outer magnet, an outer bounding ring and a locking block in a flow control system according to one embodiment of the present invention.

In order to accurately control the flow of the system by an operator, as shown in FIG. 8, scale marks can be formed on an outer peripheral surface of the operation ring 21.

Figure 2:
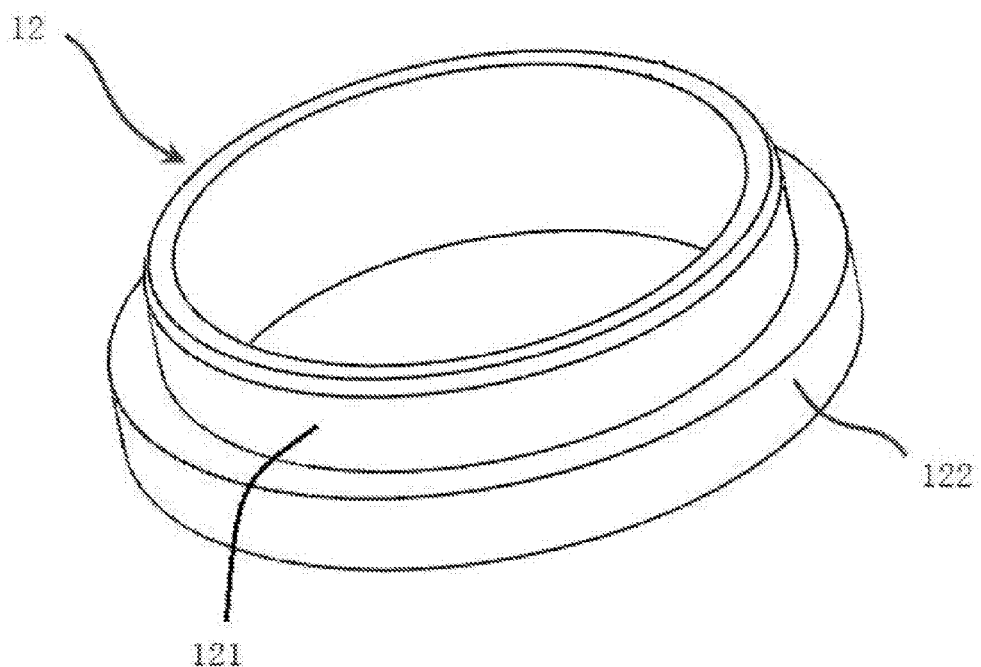
FIG. 2 is a structural schematic diagram of a main body in a flow control system according to one embodiment of the present invention.
Figure 3:
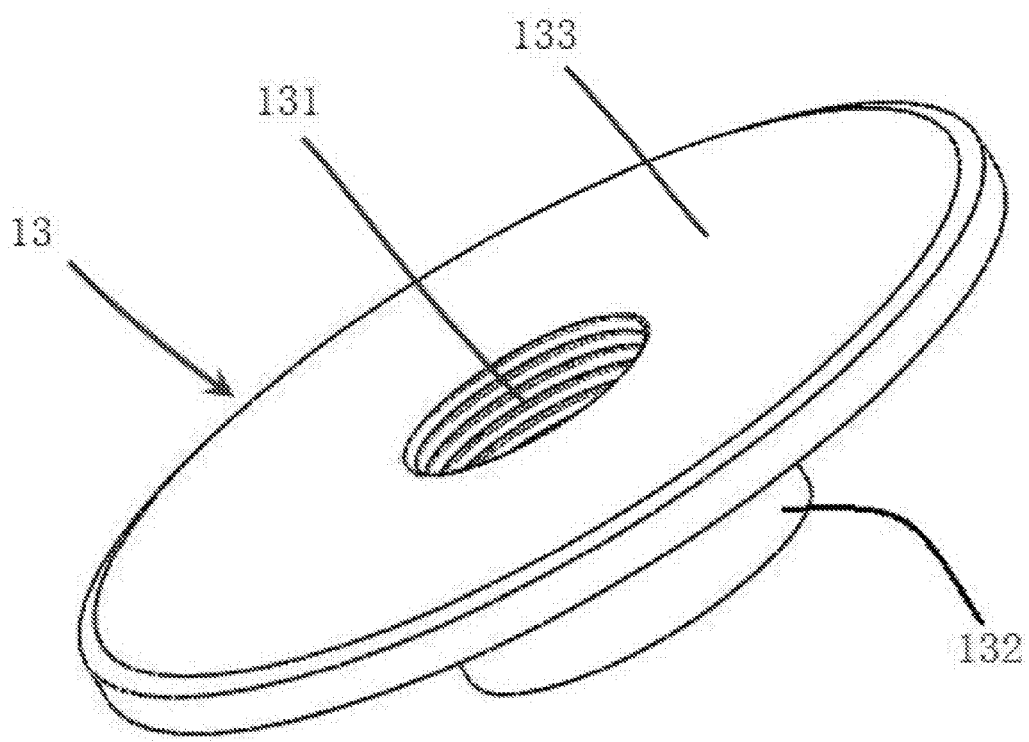
FIG. 3 is a structural schematic diagram of an outflow flange in a flow control system according to one embodiment of the present invention.

In order to prevent the operation ring 21 from moving in an axial direction of the housing, preferably, as shown in FIGS. 2 and 17, the main body 12 is constructed to a stepped shaft tube; a small-diameter end of the main body 12 is fixed on the inflow flange 11 and sleeves the annular lug boss 113; the operation ring 21 sleeves the small-diameter section 121 of the main body 12 and blocked between the inflow flange 11 and a stepped surface of the main body 12. The main body 12 can be fixed on the inflow flange 11 in a plurality of manners; for example, an end face of the small-diameter end of the main body 12 can be fixed on the engagement surface 115 of the inflow flange 11, or an inner peripheral wall of a small-diameter section 121 of the main body 12 can be fixed on an outer peripheral surface of the annular lug boss 113.

When the operation ring 21 is shifted to drive the outer magnets 22 to rotate to further drive the inner magnets 42 and the movable valve plate 41 to rotate, the first flow through hole 411 of the movable valve plate 41 may be staggered from the third flow through hole 441 of the elastic dummy plate 44 and the second flow through hole 451 of the fixed valve plate 45, thereby reducing the flow of the system. In such a case, with the reduction of the flow, the fluid pressure difference between the two ends of the housing is non-linearly enhanced, and this changing pressure acts on a wall of the first flow through hole 411 of the movable valve plate 41 and tends to force the movable valve plate 41 to return to an original position. For this reason, a locking mechanism can be set to lock the operation ring 21 at a desired position.

Figure 7:
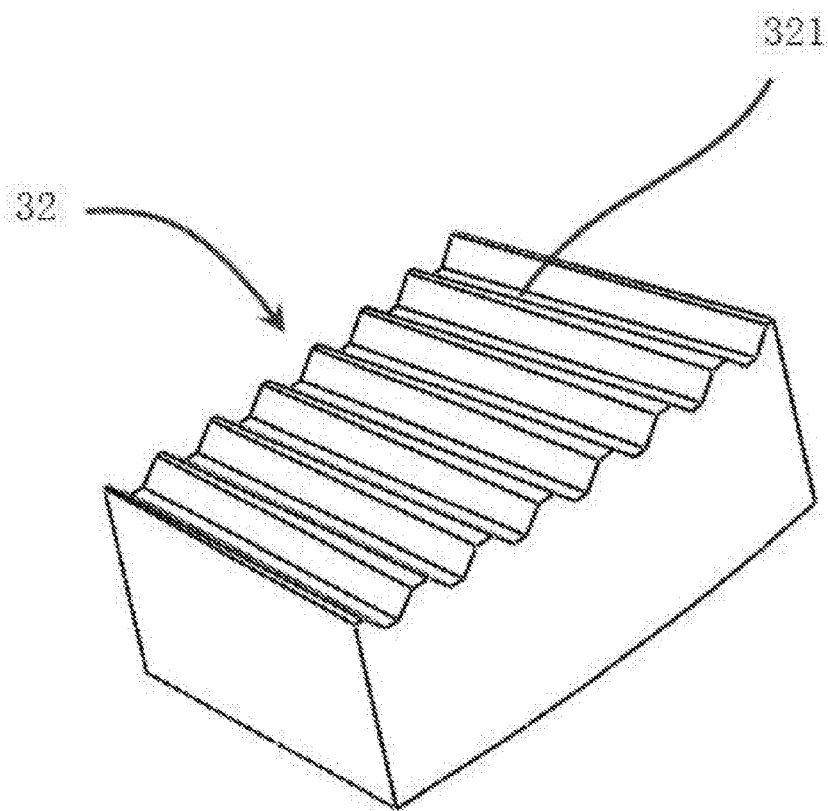
FIG. 7 is a structural schematic diagram of a locking block in a flow control system according to one embodiment of the present invention.
Figure 9:
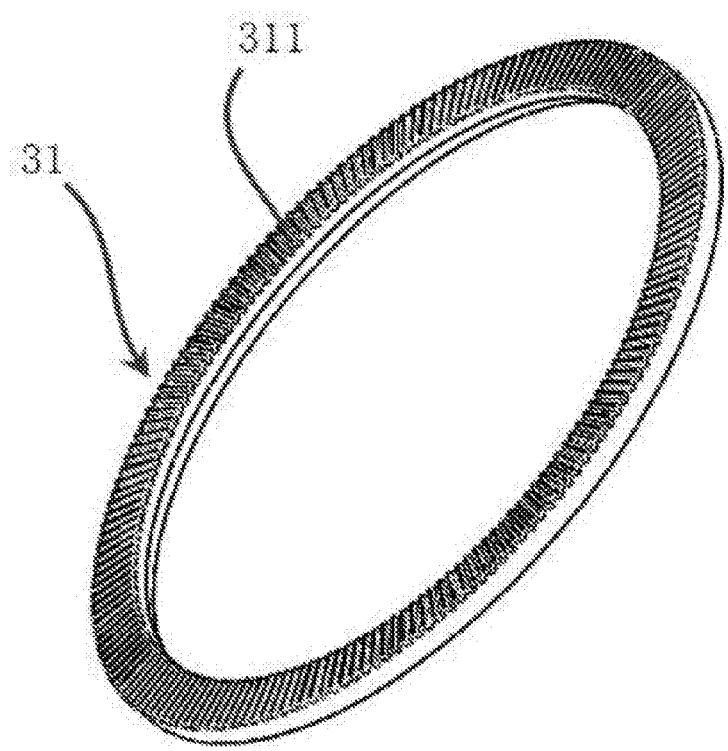
FIG. 9 is a structural schematic diagram of a locking ring in a flow control system according to one embodiment of the present invention.

The locking mechanism can be of various appropriate structural forms. In one embodiment, as shown in FIGS. 4, 7 and 9, the locking mechanism comprises a locking ring 31 and a locking block 32; the locking ring 31 is fixed on the inflow flange 11 or the main body 12 and arranged to surround the fluid inlet 111; the operation ring 21 is blocked between the locking ring 31 and the stepped surface of the main body 12; first wheel teeth 311 are formed on an end fae of the locking ring 31 facing the operation ring 21, while a limiting groove 212 matched with the locking block 32 is formed in an end face of the operation ring 21 facing the locking ring 31, and second gear teeth 321 engaged with the first gear teeth 311 are formed on the locking block 32. Here, the locking ring 31 can be fixed on the engagement surface 115 of the inflow flange 11 or the small-diameter section 121 of the main body 12.

The locking block 32 and the locking ring 31 function in preventing the movable valve plate 41 from returning to a position at a previous moment under the action of the pressure. Specifically, the operation is as follows: before the operation ring 21 is rotated, the locking block 32 is withdrawn to be disengaged from the locking ring 31; the operation ring 21 is rotated, and the outer magnets 22 drive the inner magnets 42 to rotate to drive the movable valve plate 41 to change in position and thus change the flow through the housing; and the locking block 32 is mounted so that the second wheel teeth 321 are engaged with the first wheel teeth 311 of the locking ring 31. As the locking ring 31 is fixed on the inflow flange 11, the locking ring 31 limits the rotating probability of the operation ring 21 through the locking block 32, thereby ensuring that the position of the movable valve plate 41 is not changed. At this moment, the accuracy of flow adjustment depends on the sizes or indexing numbers of the first gear teeth 311 and the second gear teeth 321. Besides, such a structure also prevents the position change and flow change of the movable valve plate 41 due to various disturbance noises produced during the working of the system, and therefore, the output flow rates are kept stable, and the system is kept in a stable state no matter how large the flow is and whether the system is opened or closed.

To protect other parts in the system against the magnetic field of the outer magnets 22 and the inner magnets 42, in the flow control system of the present invention, preferably, other parts than the outer magnets 22 and the inner magnets 42 all are made of a non-ferromagnetic material. The non-ferromagnetic material preferably can be stainless steel, an aluminum alloy, cast iron, brass or the like.

In the flow control system of the present invention, non-contact control on the system is realized by use of the characteristics of a magnetic field and a fluid pressure positive-feedback mechanism, and therefore, total tightness of the system is ensured, and furthermore, the reliability of the system is improved in the aspect of leak prevention.

In a traditional flow control system, the flow control unit is arranged in a radial direction of the flow, leading to flow direction change of the fluid in the flowing process in most cases, whereby great energy consumption and pressure loss may be caused. The flow control system provided by the present invention is controlled axially; based on the above structural features, the direction of the fluid does not need to be changed in the flowing process, and therefore, it has the advantage of low pressure loss ratio.

Due to such factors as wear of moving parts, the traditional flow control system has the defects of fluid leakage and the like since a fit clearance is enlarged in the long-time use process. With respect to the flow control system provided by the present invention, although the wear between the moving parts cannot be avoided, a self-compensation mechanism to the wear can be realized by use of a spring jacking device and the fluid pressure positive-feedback mechanism based on the axial control of the structural features, and therefore, the system can automatically compensate and eliminate a gap generated due to wear; this advantage can ensure a relative long service life of the system.

Additionally, a radial dimension of the flow control system of the present invention is easy to control so that the structure is more compact. Besides, adjustment rotation is directionally proportional to the flow and accurate flow adjustment can be realized.

The preferred embodiments of the present invention are described above in detail in conjunction with the accompanying drawings; however, the present invention is not limited to specific details in the above embodiments; a plurality of simple variations can be made to the technical solutions of the present invention within the technical conception of the present invention; these simple variations all fall into the protection scope of the present invention.

Additionally, it needs to be noted that various specific technical features described in the specific embodiments above can be combined in any appropriate way without contradiction. In order to avoid needless repetition, various possible combination ways are not described separately in the present invention.

Moreover, various different embodiments of the present invention also can be combined arbitrarily, and the combinations should also be considered as disclosure of the present invention as long as they do not depart from the ideas of the present invention.

The invention claimed is:

1. A non-contact flow control system having a totally sealed cavity, comprising a housing, a flow control unit, and an operation unit;

wherein the housing comprises a fluid inlet, a fluid outlet, and a fluid channel extending between the fluid inlet and the fluid outlet; the flow control unit is set in the fluid channel and the operation unit is set on an outer side of the housing, wherein the operation unit comprises an operation element and an outer magnet fixed on the operation element; the flow control unit comprises a flow control element and an inner magnet fixed on the flow control element; when the operation element moves relative to the housing, the flow control element moves under the action of a magnetic force between the outer magnet and the inner magnet, thereby changing the flow of the system, wherein the section of the fluid channel is circular; the flow control element comprises a disc-shaped movable valve plate and a disc-shaped fixed valve plate; the movable valve plate coaxially stacks on the fixed valve plate under the action of fluid pressure; the inner magnet is fixed on the movable valve plate; a first fluid through hole and a second fluid through hole matched with each other are formed in the movable valve plate and the fixed valve plate, respectively;

when the operation element moves relative to the housing, the movable valve plate rotates around a central axis thereof under the action of the magnetic force between the outer magnet and the inner magnet, thereby changing an overlapping area of the first fluid through hole and the second fluid through hole, wherein elastic elements are set in the housing and configured to elastically bias the movable valve plate on the fixed valve plate, wherein the housing comprises an inflow flange; the fluid inlet is formed in the inflow flange; an annular raceway is set on the inflow flange to surround the fluid inlet; a plurality of blind holes arranged at intervals in a circumferential direction of the movable valve plate are formed in the upstream end face of the movable valve plate; the elastic elements are springs arranged in the blind holes; one end of each spring props against the bottom of the corresponding blind hole, while the other end of the spring is configured to elastically bias a ball in the annular raceway.

2. The system of claim 1, wherein the outlines of the first fluid through hole and the second fluid through hole are in a sector shape; a sector center of the first fluid through hole is coincident with a center of the movable valve plate, while a sector center of the second fluid through hole is coincident with a center of the fixed valve plate; a central angle of the sector is defined as α which satisfies the following relationship: $85°<\alpha<89°$; the movable valve plate is provided with two first fluid through holes symmetrical about a center of the movable valve plate, while the fixed valve plate is provided with two second fluid through holes symmetrical about a center of the fixed valve plate.

3. The system of claim 1, wherein an elastic dummy plate is set between the movable valve plate and the fixed valve plate; the elastic dummy plate is fixed on the fixed valve plate and provided with third fluid through holes matched with the second fluid through holes; the elastic dummy plate is in interference fit with an inner wall of the housing.

4. The system of claim 1, wherein a first flow passage groove matched with the fluid inlet is formed in the middle of an upstream end face of the movable valve plate, and the first fluid through hole is in fluid communication with the first flow passage groove; a second flow passage groove matched with the fluid outlet is formed in the middle of a downstream end face of the fixed valve plate, and the second fluid through hole is in fluid communication with the second flow passage groove.

5. The system of claim 1, wherein the housing further comprises a main body; one end of the main body is fixed on the inflow flange; the operation element is constructed to an operation ring that rotatably sleeves the main body; the outer magnet is constructed to an arc-shaped magnet extending in a circumferential direction of the operation ring, while the inner magnet is constructed to an arc-shaped magnet extending in a circumferential direction of the movable valve plate; a polarity of an inner peripheral surface of the outer magnet is opposite to a polarity of an outer peripheral surface of the inner magnet, thereby forming a magnetic field attraction.

6. The system of claim 5, wherein a mounting groove is formed in an inner peripheral surface of the operation ring and the outer magnet is embedded in the mounting groove; a receiving groove is formed in an outer peripheral surface of the movable valve plate and the inner magnet is embedded in the receiving groove.

7. The system of claim 6, wherein the operation unit further comprises an outer bounding ring; the operation ring sleeves an outer peripheral surface of the outer bounding ring, and the outer magnet is in interference fit with the outer bounding ring; the flow operation unit further comprises an inner bounding ring that sleeves an outer peripheral surface of the movable valve plate, and the inner bounding ring is in interference fit with the inner magnet.

8. The system of claim 5, wherein scale marks are formed on an outer peripheral surface of the operation ring.

9. The system of claim 5, wherein the main body is constructed to a stepped shaft tube; a small-diameter end of the main body is fixed on an engagement surface of the inflow flange; the operation ring sleeves a small-diameter section of the main body and blocked between the inflow flange and a stepped surface of the main body.

10. The system of claim 9, further comprising a locking ring and a locking block; the locking ring is fixed on the inflow flange or the main body and arranged to surround the fluid inlet; the operation ring is blocked between the locking ring and the stepped surface of the main body; first wheel teeth are formed on an end face of the locking ring facing the operation ring, while a limiting groove matched with the locking block is formed in an end face of the operation ring facing the locking ring, second gear teeth engaged with the first gear teeth are formed on the locking block.

11. The system of claim 9, wherein the housing further comprises an outflow flange; the fluid outlet is formed in the outflow flange; a large-diameter end of the main body is fixed on an engagement surface of the outflow flange; the fixed valve plate is fixed in the main body; the movable valve plate is rotatably located within the main body.

* * * * *